J. W. KELLEY.
Corn-Planter.
No. 35,764.
Patented July 1, 1862.
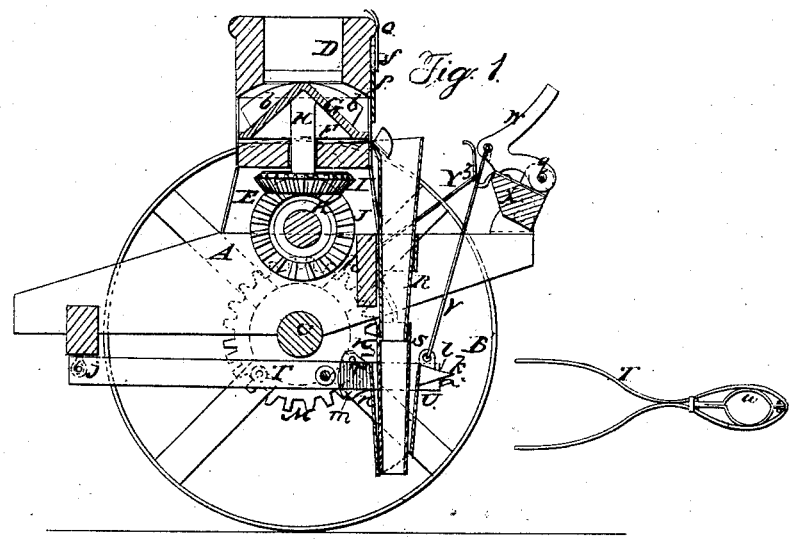
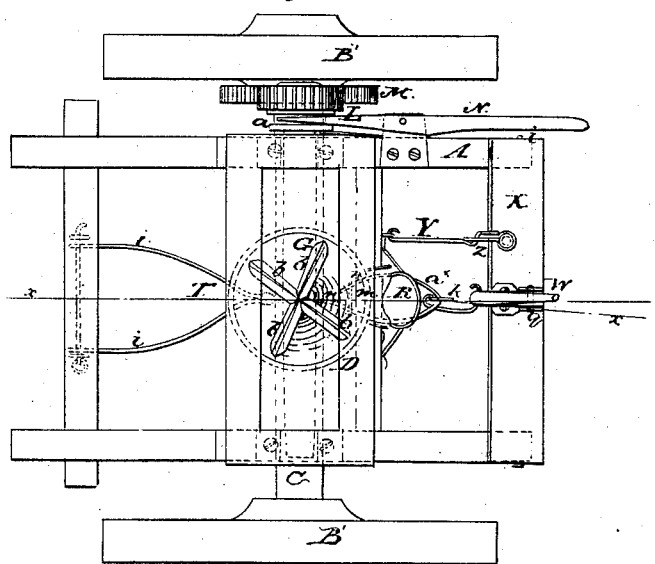
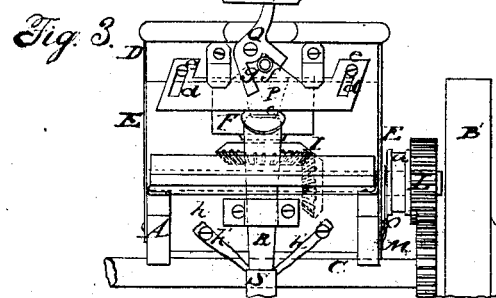
Witnesses
J. W. Coomby
G. W. Reed
Inventor:
John W. Kelley
per Munn & Co.
Attorneys

UNITED STATES PATENT OFFICE.

JOHN W. KELLEY, OF YPSILANTI, MICHIGAN.

IMPROVEMENT IN SEEDING-MACHINES.

Specification forming part of Letters Patent No. 35,764, dated July 1, 1862.

*To all whom it may concern:*

Be it known that I, JOHN W. KELLEY, of Ypsilanti, in the county of Washtenaw and State of Michigan, have invented a new and Improved Seeding-Machine; and I do hereby declare that the following is a full, clear, and exact description of the same, reference being had to the accompanying drawings, making a part of this specification, in which—

Figure 1 is a side sectional view of my invention, taken in the line $x\ x$, Fig. 2. Fig. 2 is a plan or top view of the same. Fig. 3 is a reduced back view of the upper part of the same.

Similar letters of reference indicate corresponding parts in the several figures.

This invention relates to an improved seeding-machine of that class designed for sowing seed in drills; and it consists in the employment or use of a rotary agitator or distributer in connection with an adjustable gate arranged in such a manner that a greater or less quantity of seed may be sown on a given area, as desired.

The invention also consists in a novel arrangement of the tooth which forms the furrow and conveys the seed thereto, whereby the tooth may be allowed to yield or give in case of meeting with obstructions in its path.

To enable those skilled in the art to fully understand and construct my invention, I will proceed to describe it.

A represents a rectangular frame, which is mounted on two wheels, B B', placed loosely on their axle C, the latter being attached permanently to the frame A.

D is a seed-box, which is secured to the upper ends of standards E E, one being at each side of the frame A. The seed-box D is equal in length to the width of the frame A, and to the lower part of the seed-box there is attached centrally a cylindrical box, F, in which a conical agitator or seed-distributer, G, is placed vertically. This seed-distributer is connected to the upper end of a shaft, H, the lower end of which, below the box F, has a bevel-wheel, I, upon it, which gears into a corresponding wheel, J, on a horizontal shaft, K, the latter having its bearings on the frame A.

On the shaft K there is placed a sliding pinion, L, which is connected with said shaft by a feather and groove. This pinion L, when the machine is at work, gears into a wheel, M, which is attached concentrically to the inner part of the hub of the wheel B'. The pinion L has a lever, N, connected with it for the purpose of throwing said pinion out of gear with the wheel M when it is desired that the seed-distributing device should be inoperative; and a spring, O, which is attached to frame A and bears against a hub, $a$, on pinion L, has a tendency to keep the latter in gear with wheel M. (See Fig. 3.)

To the upper surface of the seed-distributer G there are attached four or more flanges, $b$, which extend radially from its center or apex to nearly its outer edge or base. These flanges project upward or outward a suitable distance from the face of the distributer. (See Fig. 1.) The distributer is allowed to rotate freely within the box F, but it is fitted within it sufficiently snug to prevent seed passing down between it and the box F.

In the back part of the box F there is made an opening, $c$, the lower edge of which is on a line with or a little below the base or lower edge of the seed-distributer, as shown in Fig. 1; and to the back side of the box D there is attached a slide, P, the upper part of which is provided with oblique slots $d\ d$, through which screws or pins $e\ e$ pass into the back of seed-box D. (See Fig. 3.) The slide P has a projection, $f$, at about its center, and this projection fits in the fork $g$ of a lever, Q, which is also attached to the back of the seed-box D, and by operating which the slide P may be raised and lowered to expose more or less of the opening $c$ in the box F.

To a cross-piece, $h$, of the frame A there is attached a vertical tube, R, the upper end of which is just below the opening $c$. This tube R extends downward a suitable distance, and it is fitted within a flexible tube, S, of leather, india-rubber, or other suitable material, which is attached to the cross-piece $h$, as shown at $h'\ h'$.

T represents a draw-bar for the tubular or hollow tooth U. This draw-bar is made of a single piece of thin metal bent or doubled so as to form two bars, $i\ i$, the front ends of which are fitted on a rod, $j$, at the under side of the front part of the frame A. The back parts of the bars $i\ i$ are bent so as to form an oval, $a^x$, for the upper part of the tooth U to fit into, and the upper end of said tooth at its back part is provided with a projection, $k$, which fits in a hole, $l$, at the back part of the draw-bar, and serves to retain the tooth in the draw-bar, as shown clearly in Fig. 1.

To the upper part of the tooth U, at its front side, there is attached a projection, $m$, of segment form, and provided with a small cross-piece, $n$, at its upper and lower end. These cross-pieces serve as stops, the upper one preventing the tooth U being forced at its lower end beyond a certain distance, and the lower one preventing the lower end of the tooth being raised beyond a certain distance. The front part of the segmental projection $m$ is at the front part of the oval $a^x$ of the draw-bar, and said projection has two or more holes, $o$, made in it, in one of which a wooden pin, $p$, is placed to hold the tooth U in proper working position, the pin $p$ resting on the upper surface of the draw-bar. (See dotted lines in Fig. 2.)

To the back part of the draw-bar T there is connected a rod, V, which extends upward, and is attached to a bent lever, W, the fulcrum-pin $q$ of which is connected to a bar, X, placed on the back part of frame A, and connected to it by pivots or joints $r$—one at each end.

The operation is as follows: As the machine is drawn along the seed-distributer G is rotated through the medium of the gearing I J, and the seed in the box F is discharged through the opening $c$ by the revolution of G with the flanges $b$. This discharge of seed from F is regulated by adjusting the slide P, and the seed passes from opening $c$ into the upper end of the tube R, which conveys it into the flexible tube S, the latter conveying it into the hollow or tubular tooth U, which directs it into the furrow. In case the tooth U meets with an obstruction in its path, the wooden pin $p$ will break and allow the tooth to be forced back and pass over the obstruction, the upper stop, $n$, of the projection $m$ preventing the tooth being forced back unnecessarily far. At any time when it is necessary to elevate the tooth U out of the ground it may be done by actuating the lever W; and in order to keep the tooth elevated when the machine is being drawn from place to place, the bar X is tilted upward and held in such position by means of a rod, Y, which rests against an arm, Z, on X, as shown in Fig. 1.

The arrangement of the oval $a^x$ in the draw-bar T is an important feature of the invention, as it affords a convenient receptacle to receive the tooth U and projection $m$, and also affords a convenient means to secure the tooth U to the draw-bar through the medium of the projection $k$, while in consequence of having the tooth U connected to the lever W, attached to the tilting bar X, the tooth may not only be conveniently raised temporarily, but also permanently held in an elevated state when the machine is being drawn from place to place.

The rotating seed-distributer G performs its work in a perfect manner, while the slide P admits of the discharge of seed being regulated with the greatest nicety, any amount being sown on a given area of ground, as may be desired.

I do not claim broadly a rotating seed-distributer, for they have been previously used and arranged in various ways; but I do claim as new and desire to secure by Letters Patent—

1. The horizontal rotating seed-distributer G, when provided with flanges $b$, and placed in a cylindrical box, F, below, and communicating with the box D, and used in combination with the slide P, arranged to work over the discharge-opening $c$ of the box F, as and for the purpose herein set forth.

2. The arrangement of the loop $a^x$ at the back part of the draw-bar T, projection $k$, and segmental flange $m$, attached to the tooth U, and fitted in the loop $a^x$, all arranged, as shown, to admit of the tooth being secured to the draw-bar and the former working therein, as and for the purpose set forth.

JOHN W. KELLEY.

Witnesses:
PHILO FERRIER,
M. S. SHUTTS.